(12) United States Patent
Kish et al.

(10) Patent No.: US 10,667,089 B2
(45) Date of Patent: *May 26, 2020

(54) PERFORMANCE MAPPING

(71) Applicant: ARRIS Enterprises LLC, Suwanee, GA (US)

(72) Inventors: William S. Kish, Sunnyvale, CA (US); Dave Lin, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,416

(22) Filed: Apr. 18, 2018

(65) Prior Publication Data

US 2018/0242103 A1   Aug. 23, 2018

Related U.S. Application Data

(63) Continuation of application No. 14/748,153, filed on Jun. 23, 2015, now Pat. No. 9,998,852.

(60) Provisional application No. 62/016,539, filed on Jun. 24, 2014, provisional application No. 62/097,939, filed on Dec. 30, 2014.

(51) Int. Cl.
*H04W 4/029* (2018.01)
*H04W 16/20* (2009.01)
*H04W 24/10* (2009.01)
*H04W 64/00* (2009.01)
*H04W 84/12* (2009.01)

(52) U.S. Cl.
CPC ........... *H04W 4/029* (2018.02); *H04W 16/20* (2013.01); *H04W 24/10* (2013.01); *H04W 64/003* (2013.01); *H04W 84/12* (2013.01)

(58) Field of Classification Search
CPC ....... H04W 4/02; H04W 16/20; H04W 24/10; H04W 4/029; H04W 64/003; H04W 84/12
See application file for complete search history.

(56) References Cited

U.S. PATENT DOCUMENTS

| | | | |
|---|---|---|---|
| 9,998,852 B2 * | 6/2018 | Kish | H04W 24/10 |
| 2006/0105759 A1 * | 5/2006 | Betge-Brezetz | H04W 24/00 455/422.1 |
| 2008/0070509 A1 * | 3/2008 | Kish | H04B 17/0085 455/67.13 |
| 2010/0248745 A1 * | 9/2010 | Ozawa | G01C 21/20 455/456.3 |
| 2010/0323659 A1 * | 12/2010 | Wehling | H04M 1/72516 455/404.2 |

(Continued)

*Primary Examiner* — Chi H Pham
*Assistant Examiner* — Weibin Huang
(74) *Attorney, Agent, or Firm* — Stewart M. Weiner; Myers Bigel, P.A.

(57) ABSTRACT

Methods and computer-executable instructions for mapping performance data of wireless systems include receiving from an access point actual performance information, such as throughput, of a user device at a particular time, along with an identifier of the access point, and location information of the user device. Then, using the received actual performance information, the received location information, and the particular time to map the received actual performance information on a map of an area around the mobile device. In certain embodiments, converting the mapped actual performance information into a visual reference gradient for display on the user device.

19 Claims, 13 Drawing Sheets

(56) References Cited

U.S. PATENT DOCUMENTS

| | | | |
|---|---|---|---|
| 2012/0009890 A1* | 1/2012 | Curcio | H04L 29/06 455/230 |
| 2013/0321424 A1* | 12/2013 | Pylappan | G06T 11/00 345/440 |
| 2013/0325326 A1* | 12/2013 | Blumenberg | G01C 21/32 701/428 |

* cited by examiner

| 1 | 15 | 18 |
|---|----|----|
| 14 | 20 | 21 |
| 24 | 45 | 30 |
| 0 | 20 | 48 1102 |

FIG. 11 A

PERFORMANCE MAPPING

CROSS REFERENCE

This application is a continuation of U.S. application Ser. No. 14/748,153, filed Jun. 23, 2015, which claims the benefit of U.S. Provisional Application No. 62/016,539, filed Jun. 24, 2014, and U.S. Provisional Application No. 62/097,939, filed Dec. 30, 2014, both of which are hereby incorporated by reference in their entirety.

TECHNICAL FIELD

This application relates to the field of wireless networking and mapping service performance capabilities in a given location.

BACKGROUND

Wireless networks allow mobile client devices to communicate without a hard wired connection to a network. But such wireless connections may offer different levels of service performance in different locations due to many variables. Making such service performance information available in any given area serviced by a wireless connection may be beneficial.

SUMMARY

The aforementioned need is satisfied by systems and/or methods here for gathering, analyzing, and mapping performance data for wireless networks.

Systems and methods here include mapping performance data of wireless systems, including, via a controller in communication with a network, an access point (AP) and a data storage, receiving performance information of a user device from the access point via the network, receiving location information of the user device via the network, storing the received performance information and the received location information in the data storage, correlating the received performance information to a map indicator, and plotting the map indicator on a map of an area using the received location information. In some examples, the performance information is throughput data. Additionally, or alternatively, in certain examples, the map indicator is a color indicator correlated to the received performance information. And in some examples, the map indicator is a shaded indicator correlated to the received performance information.

BRIEF DESCRIPTION OF THE DRAWINGS

In order to understand the invention and to see how it may be carried out in practice, examples will now be described, by way of non-limiting example only, with reference to the accompanying drawings, in which:

FIG. 10 B is an example graph of the performance calculations from FIG. 10 A according to certain examples of the inventions described here.

FIG. 11 B is an example graph of the performance calculations from FIG. 11 A according to certain examples of the inventions described here.

DETAILED DESCRIPTION

Reference will now be made in detail to various embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview of Wireless Network Examples

Wireless networks are capable of providing service to various client devices depending on many variables. But such service may not be uniform throughout a given location. Users in a particular area usually desire better service, but may have trouble finding it. Thus, it may be desirable to better understand what level of service is being provided to client device users throughout the location due to various factors. Such information could be provided to users in order for them to efficiently utilize the provided service within their location. Systems and methods here provide for compiling performance information from the network side and/or the client device side such as via an application. Such information could be used in many ways including but not limited to informing client device users of the varying levels of service available in a given area with a map, directing client device users to locations that could provide better service than the service being offered in their current location, and providing information to network administrators who are looking to install APs in a given location to optimize the overall service provided by the AP deployment, or many others.

Figure 1:
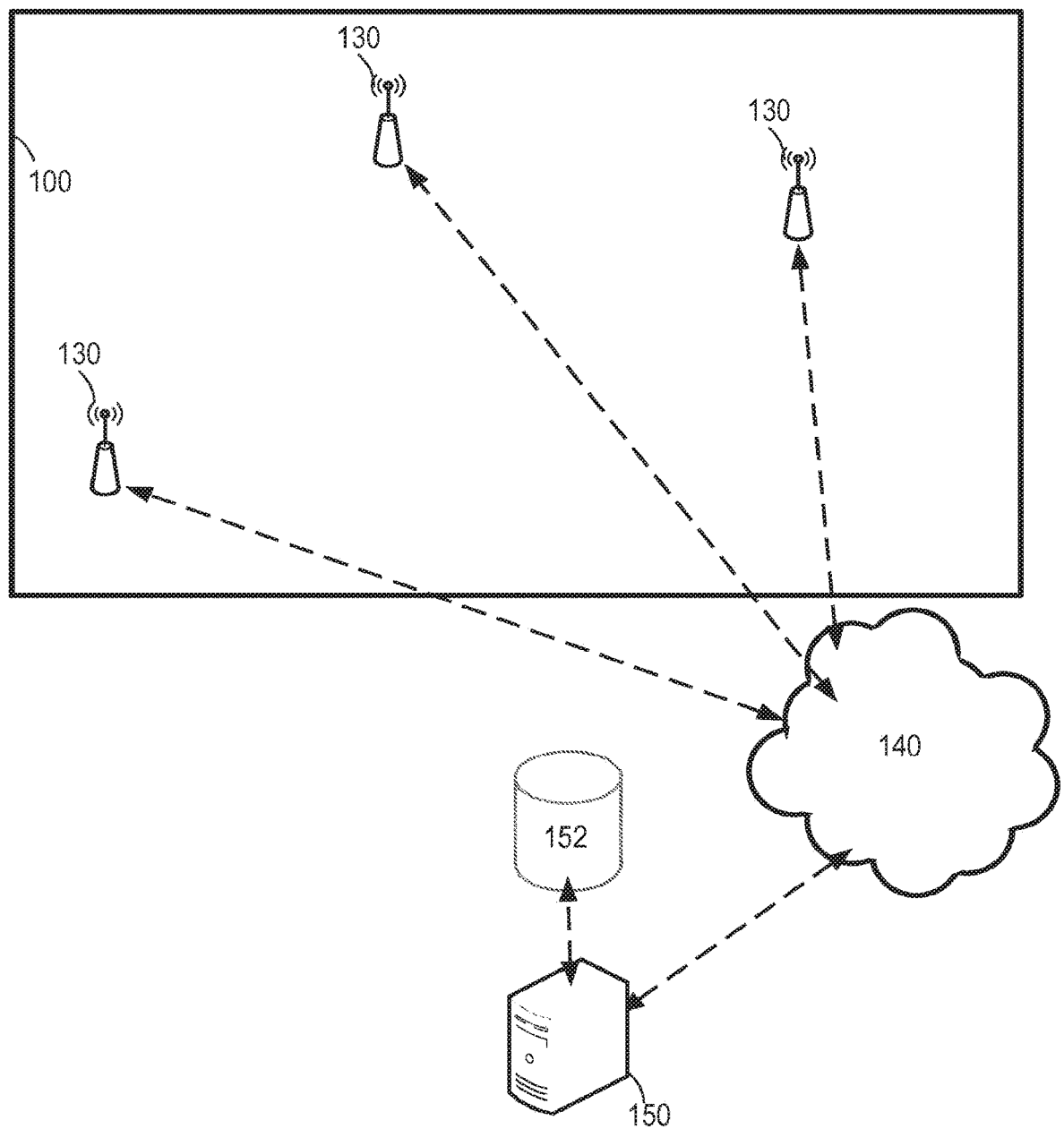
FIG. 1 is a network diagram with multiple APs showing one example system to implement certain examples of the inventions described here.

An example network is shown with APs deployed within some bounded area in FIG. 1. FIG. 1 shows an example location 100, and inside of this example location are three APs 130. These APs are in communication with a network 140 which in turn provides access to any number of network computers and/or servers 150. Some examples could be a controller, an Authentication, Authorization and Accounting server, any number of back end servers, which may be in communication with a data storage 152. The data storage 152 may not necessarily be hard wired to the servers 150 but could also be cloud based storage accessible through the network 140. Additionally, or, alternatively, some embodiments could have a localized controller 150 that is not accessed by the APs 130 through the network 140 but rather locally.

It should be noted that wireless networks may utilize any number of ways to communicate with any number of client devices. Radios such as WiFi access points (APs), such as the example in FIG. 1 shows 130, cellular, small cell radios, femtocell radios, and other radios may allow client devices to connect to other client devices as well as to a network such as the internet. As any and all of these radios could be utilized in the descriptions here, the term AP should not be considered limiting, but merely exemplary. The term WiFi is meant to represent any wireless communication methods available.

Of note, APs, controllers, as well as user devices and servers could have any of various computer components in them, or able to be accessed by them over a network. Thus, any of these devices could utilize any or all of a processor, memory, data storage, network input/output, and display.

It should also be noted that client devices (not shown) that are capable of wirelessly communicating on such networks could be any number of things including but not limited to cell phones, smartphones, tablets, laptops, phablets, wearable smart devices, automobiles, or any other device capable of wireless communications. Thus, in this disclosure the term client device should not be considered limiting but should be considered as any kind of wireless device capable of wireless communications.

In this document, the level of "service" provided to and/or available to a particular client device could be any number of things including throughput, discussed more thoroughly below. Use of the term "performance" or "throughput" is not intended to be limiting, and the service performance could be any number of things including throughput, signal strength, connectivity, power, as well as, or alternatively, any other performance metric.

Overview of Potential Performance Available for Client Devices in an Area

User devices in a given area which associate to an AP and thereby the internet or other network, may experience varying levels of service, performance, or connectivity to that network. Such varying service may affect the data packet transmission rates available to those client devices. One way to look at such service is by calculating or estimating the performance, such as throughput that the client device is able to achieve through a given AP.

Throughput, as one example of performance, may be considered the rate of successful message delivery over a communication channel, such as a wireless WiFi channel for example. Such throughput may be measured or estimated in bits per second (bit/s or bps), and sometimes in data packets per second or data packets per time. Throughput available to individual client devices, along with any of other various performance metrics, may be calculated and/or estimated by the client device itself, the APs, and/or the controller in communication with the APs in the normal course of operation. Even though throughput may be calculated as the theoretical data transmission possible through a given AP, each client device associated to a particular AP may experience different throughput because of various factors besides the APs theoretical limits. The same could be true of any of other various performance metrics. Such factors may include interference, congestion, or other variables in the physical space they occupy. Thus, it may be beneficial to understand the potential throughput available throughout a given area, separate from what the individual APs may calculate as their own theoretical maximum potential throughput to the network.

It should be noted that sometimes, individual user devices may be capable of different performance such as throughput, even among those associated to the same AP. For example, Laptops may have 3 radio channels where a smartphone may only have one. Because of this, additionally, or, alternatively, certain embodiments here may normalize the throughput calculations/estimations to that of an average and/or exemplary device in order to calculate throughput. Such throughput data points, or other performance metrics, over a given area may be used to create a map as described below. Despite different capabilities of individual client devices, maps showing throughput in a given location may still show relative throughput gradients throughout an area. Thus, using such maps, users could still understand where to receive relatively better or worse service, independent of the individual capabilities of their client devices.

Figure 3:
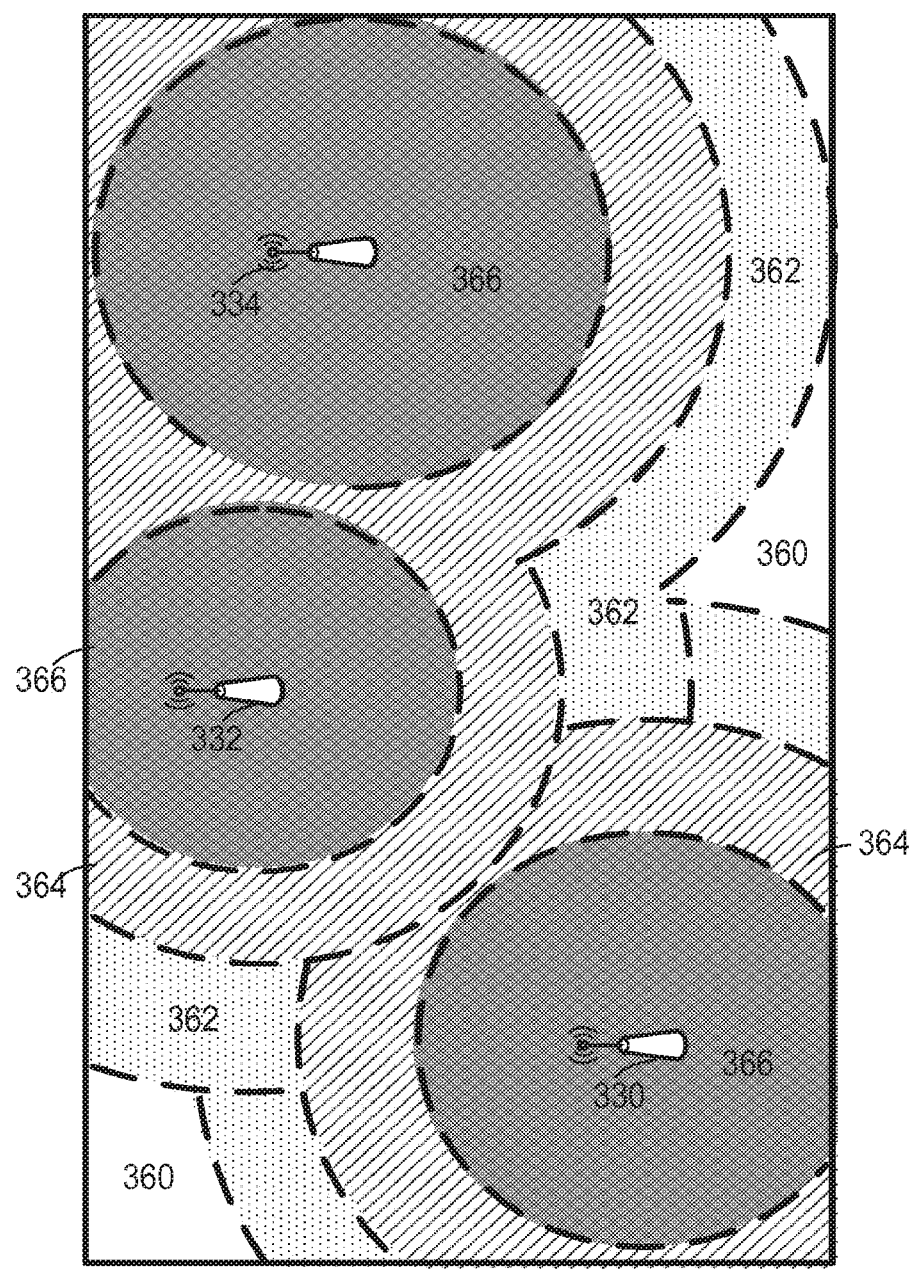
FIG. 3 is a network diagram with multiple APs in a bounded area showing one example system to implement certain examples of the inventions described here.

FIG. 3 shows an example map where the APs 330, 332 and 334 are shown radiating. The dashed lines surrounding the APs are representative of various distances from the APs. The different shades of the rings represent the relative potential available performance in those locations based only on the AP. For example the dark shade 366 are the best performance, the lined medium shade 364 is the next best, the dots 362 is worse than that and the no shading 360 is the worst available potential performance in this location.

In the example shown in FIG. 3, the performance available in the location is affected only by the physical distance from the AP. In other words, the further from the AP, the less potential performance is available to a given client device. Such a map could be considered the best case potential performance available in a given area through the various APs. In the example of FIG. 3 there are no other various physical interferences or congestion shown affecting potential performance as will be discussed below.

More Factors Affecting Performance

The best case potential performance of FIG. 3 may not exist in the physical world. Different potential variables may interfere and affect the potential performance available through any given AP. The examples in FIG. 4 show what potential performance could be available in a given area, affected by the various factors disclosed above including such examples as AP deployment, congestion, physical barriers and interference.

Figure 5:
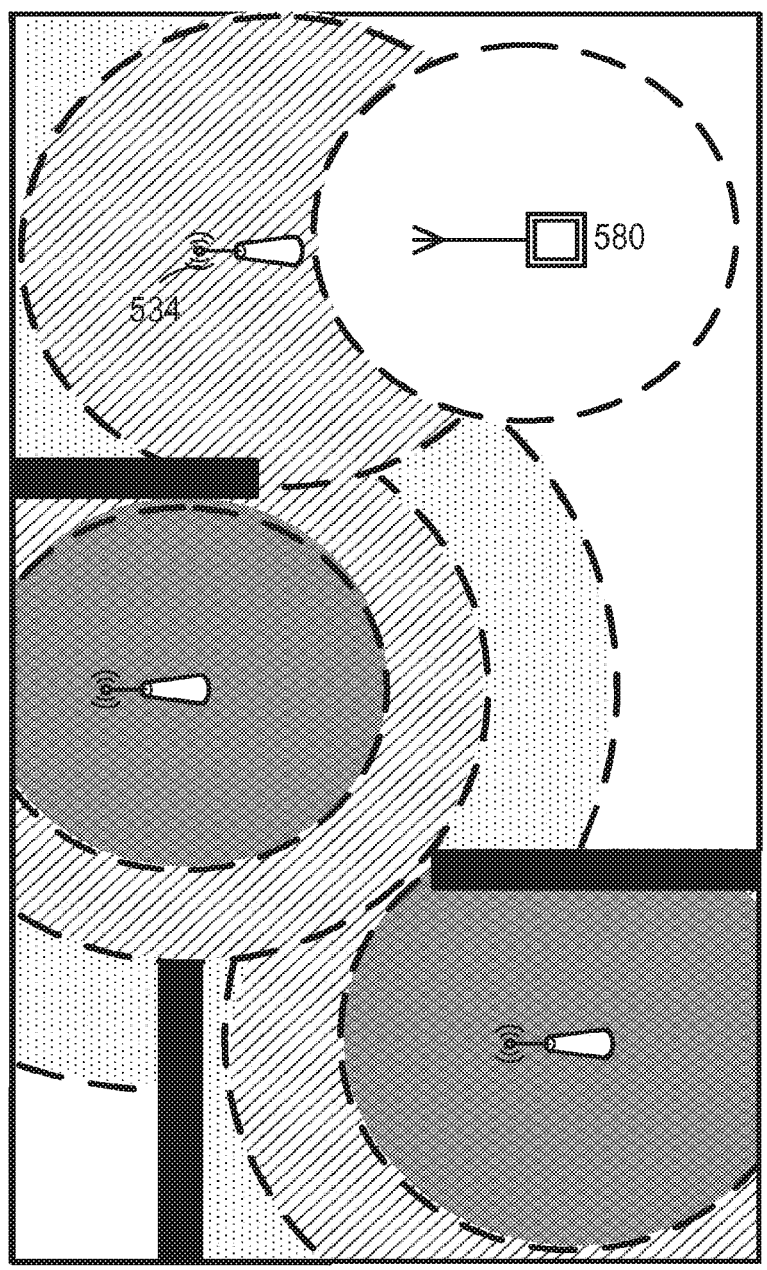
FIG. 5 is an example map showing potential performance affected by interference according to certain examples of the inventions described here.
Figure 6:
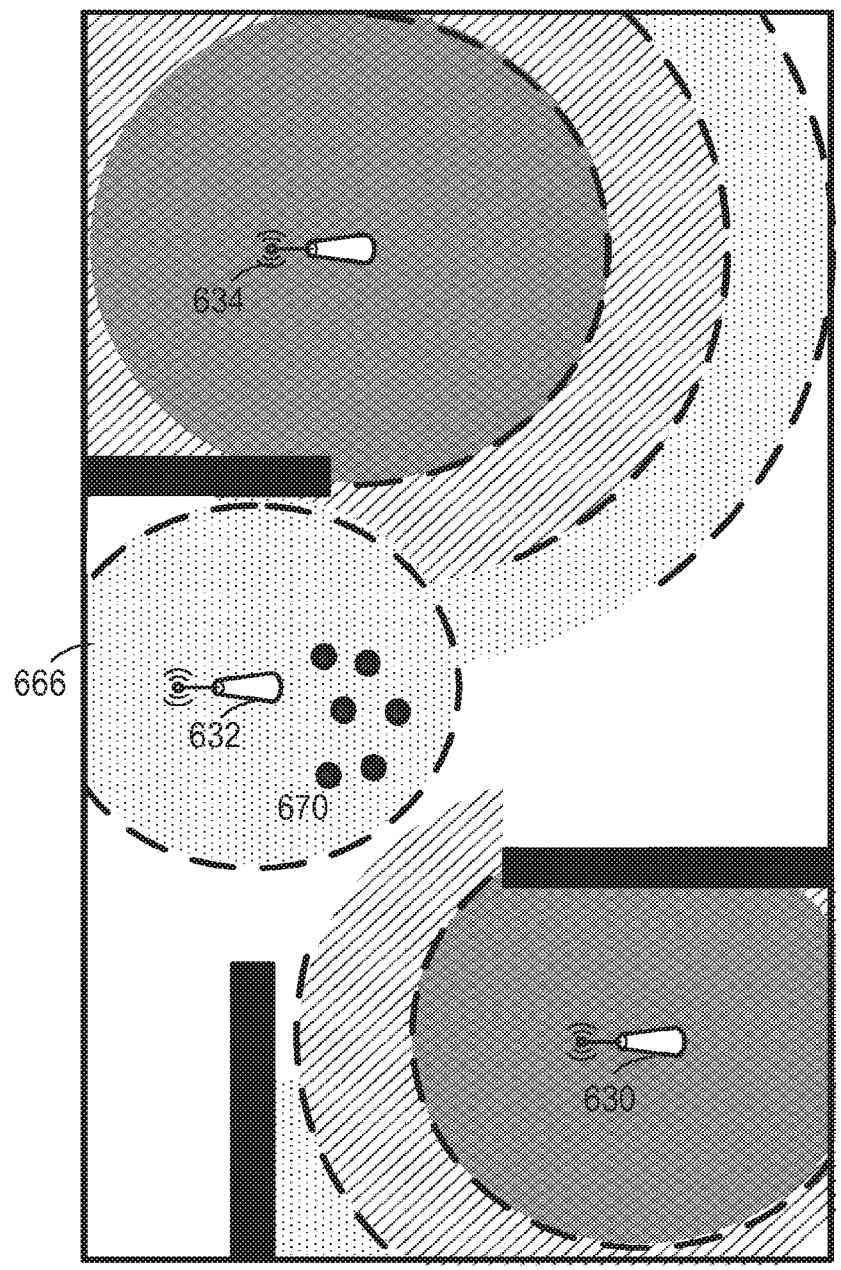
FIG. 6 is an example map showing potential performance according to certain examples of the inventions described here.

Different environmental factors could affect the potential performance experienced by individual client devices associated to various APs in a given area. Environmental considerations that may affect the ability for either the APs and/or the client devices to communicate could be any number of things. FIGS. 4, 6 and 5 show a few examples.

Figure 4:
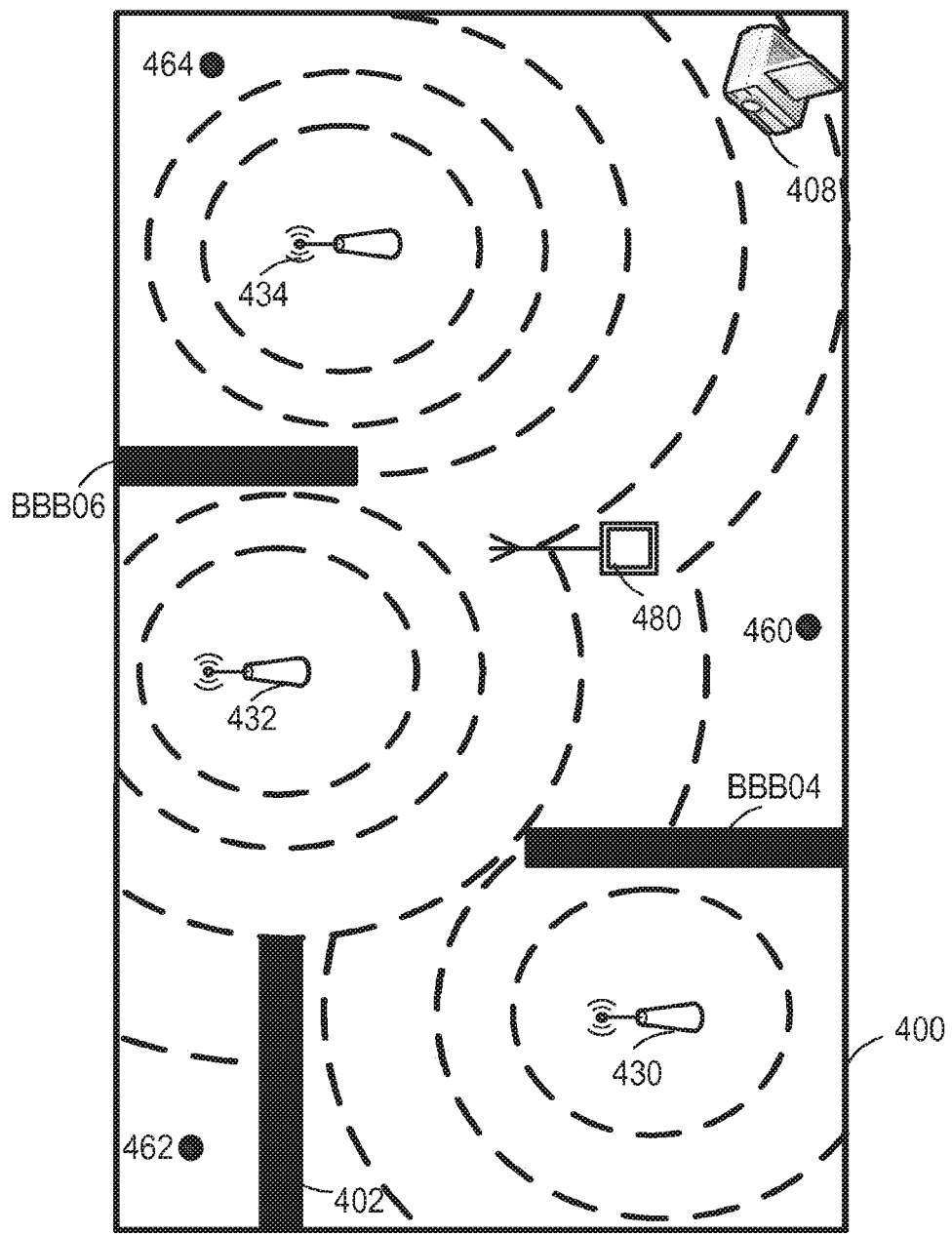
FIG. 4 is a network diagram with multiple APs showing one example system to implement certain examples of the inventions described here.

For example, FIG. 4 shows an area where various APs 430, 432 and 434 are deployed in a particular location 400.

This example location happens to include various physical and/or environmental characteristics that may affect the service that any given AP deployed there may provide to a client device in the location. In this example, physical walls are shown 402, 404, 406 which affect the propagation of the radio signals from the variously deployed APs 430, 432 and 434 as well as the client devices which could be in the area.

In the example, client device 462 is behind a wall 402 that blocks most or all of the signal from AP 430. The client 462 does receive some signal from AP 432 but again the wall 402 blocks some of that signal and possible performance. This is different from client device 464 which is both close to and unblocked from AP 434. Another client device 460 is farther away from AP 434 and AP 432 and is also blocked by wall 404 from AP 430 as well as a radio 480 between it and the AP 432. These different client devices at the different locations inside this one area 400 experience different levels of available performance.

Other factors such as interfering transmitters could affect the AP and/or client devices such as baby monitors, security cameras 408, or other radios 480. Still other things that emit interference such as a microwave, television, computer screen, etc. could also cause interference, as discussed further in FIG. 5.

Another example regarding interference, FIG. 5 depicts the potential performances affected by some interference source 580. Because 580 is radiating in or around the same frequency bands that the APs operate, the signals may interfere with the AP, any client device in the area, or both. Thus, in the example, although there are no clients associated with AP 534 as in the congestion examples, the potential performance of that AP 534 may still be affected by the interference source 580 which may effectively degrade the AP 634 and its potential available performance.

Congestion may also be a factor. In the example of FIG. 4, if client 464 were actually 5 client devices, all associated to AP 434, then each of them may have less available throughput than client 460 which may receive better performance from AP 432 even though it is farther away from it, simply because there are fewer client devices associated to it and consuming bandwidth.

FIG. 6 shows another congestion example where performance available from APs are shown affected by multiple client devices associated with the APs.

In FIG. 6, the AP 632 has little throughput available, even close to the AP, because there are many clients shown associated to it 670. The outer rings of throughput available at AP 632 are gone and the closest ring shows a poor performance 666. This is contrasted with the other APs 630 and 634 which in the example have no clients associated to them, and therefore still have the same potential throughput available as shown in FIG. 3 which is shown as affected only by the physical boundaries.

Any of the above examples of physical boundaries, congestion and interference could be combined in various ways in actual environments. Further, such performance factors may change over time as interfering emitters turn on and off and change power and frequency, client devices become associated to different APs, and even if physical doors and structures are moved in any given area.

Network Based and Client Device Reporting Based Mapping

The systems and methods here could be used to create maps of the performance that was actually experienced by client devices in a given area. This could be done by network based and also client device reporting based mapping of location and corresponding experienced performance.

Network-based mapping may utilize the network APs, additionally, or, alternatively, some embodiments utilize controllers to estimate client device locations and the associated performance the system calculates that the client device is experiencing. Client device reporting based mapping systems could utilize reported client device location and performance information from the client devices themselves. For example, such information could be gathered and calculated through an application on each client device that reports such data to the system.

It should be noted that use of the term "controller" is not intended to be limiting. A controller as used here could be any number of networking devices, and/or collection of devices used to complete any of various tasks such as control, manage, and/or coordinate with APs and back end systems.

Network Based Mapping Examples
Calculating Location Information of Client Devices Additionally, or, alternatively, in the network-based example embodiments, it may be useful for the system to have the APs and/or controllers calculate the approximate position of a client device relative to the deployed APs. Certain examples may use a location engine to estimate the location of the user, relative to the APs. These examples could populate a virtual map of a given area including the location of any deployed APs and the client devices.

Such a calculation or estimation may be done using time and distance calculations for the various data packets being sent to/from the various APs in an area. For example, one AP could calculate the approximate time it takes for a client device to send a data packet to it from the client device. These times could be used to estimate a distance from the client device to the AP. If a second AP also makes its own calculation, the APs in conjunction, or a controller receiving both sets of information, could use the information and information of the position of the deployed APs to approximate the relative distance from each AP and the position of the client device. Such an example is shown in FIG. 2.

Figure 2:
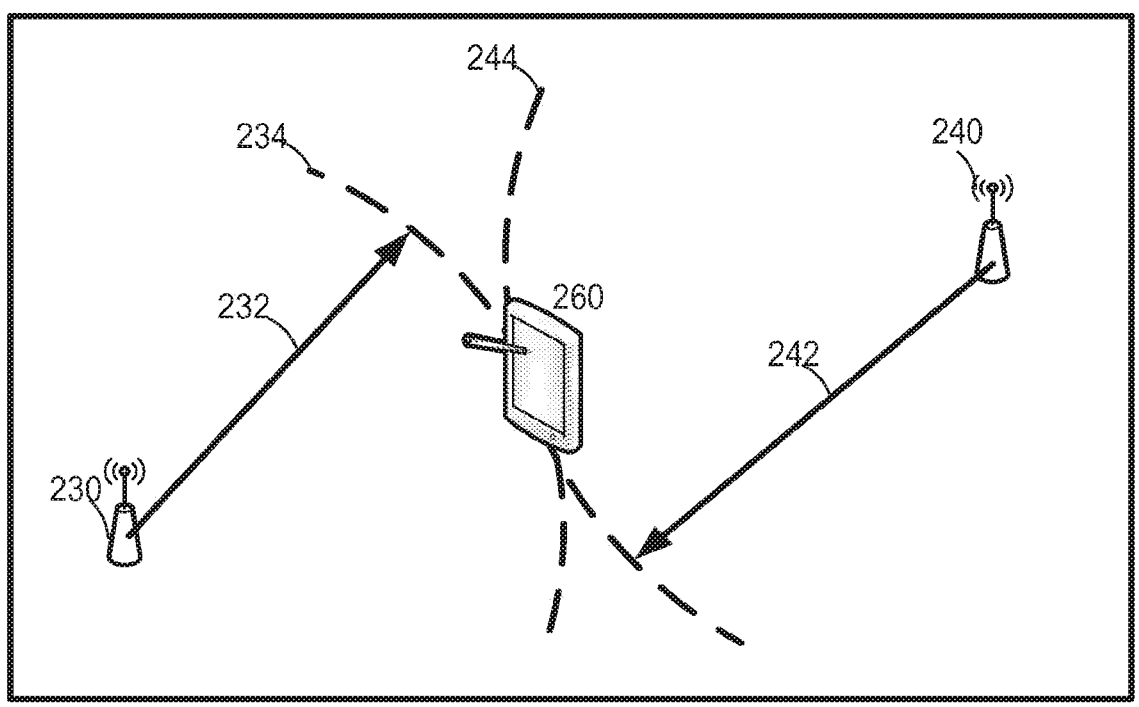
FIG. 2 is a network diagram with multiple APs showing example time/distance triangulations regarding certain examples of the inventions described here.

The example embodiment of FIG. 2 shows how one AP 230 can detect a range 232 of a client device 260. This allows the system, either the AP itself or a controller (not shown) in communication with the APs, to calculate a range arc 234 from the AP. A second AP 240 in this example also calculate a range 242 of the AP 240 to the client device 260. From this range 242, the AP and/or controller could estimate a range arc 244. Using the combination of the two range arcs 234, 244, and the known position of the APs 230, 240, the APs and/or controller could estimate where those range arcs intersect, and predict the location of the client device 260. If a third AP distance calculation is used, the system could triangulate using all three. Additionally, or, alternatively, in some embodiments, even more APs could contribute range information.

Additionally, or alternatively, other ways of calculating position may be utilized as well. A GPS location from a device may be reported to the system and used in mapping performance. Additionally, or alternatively, triangulation may be used among various APs. Additionally, or alternatively, client devices may locate one another and report that information to the system as well.

Calculating Network-Based Mapping Examples of Performance for Client Devices

The examples of FIG. 4, FIG. 5 and FIG. 3 show how potential performance, such as for example, throughput may be affected in a given real world environment. But this potential theoretical performance information may not be readily available to the system for any particular location.

Thus, the system may have to calculate performance information for various client devices in various places in the location, and over time, build an aggregated set of data points for mapping the various performance experiences of users in the various locations. This would be the real world or actual received and experienced performance not only from the AP perspective but also from the user device perspective. In such an example, the map would not immediately look like the example maps of FIG. 4 or FIG. 3, but over time, could come to resemble them in terms of being completely filled out with information, based on the actual individual client device experiences of performance, where the data points are collected and used to populate the map. Of course, each individual map could look different based on the performance measurements in a given area.

Additionally, or, alternatively, in some example embodiments, Simultaneous Location estimation And Mapping (SLAM) techniques may be used to build the maps over time, as data points are received and/or calculated by the system. In such a technique, without knowing beforehand what locations will allow for what performance, the system is able to build up the map using received and/or calculated data points of various locations on the map, and the estimated performance at those locations. Then those data points may be used to populate the map. Over time, the map fills out and even updates with newer data points.

This aggregate mapping could be accomplished in any of various ways. For example, individual APs could gather the performance information regarding individual client devices and send that information to a controller. AP's in the normal course of operation may estimate performance that client devices are experiencing for any various reasons other than mapping.

The controller could aggregate the information and use it to populate a map of the area with data points of the performance experienced by the various client devices in the different areas over time, together with the location information of the client devices and APs. As reports of performance were sent to the controller, the map could be updated. The central controller need not be a controller but possibly a stand-alone server or cloud based service that aggregated the information and assimilated it into a map or data set.

In certain distributed examples, the APs could gather the information and share the information with one another, independent of a controller. Additionally, or, alternatively, in such a distributed embodiment, the APs could calculate their locations, the locations of the client devices and estimated performances and populate the maps. Additionally, or, alternatively, in some embodiments, the APs could share that information with other APs which could then aggregate their information and build the maps using the other APs information as well as their own.

Using both the location information gathered and stored for the various client devices in a given area, together with their individual performance estimations/calculations at those locations over time, certain embodiments here, alternatively or additionally, may aggregate all of that data over the entire location space. Historical data could be combined in different way such as averaging or using those over a threshold or any algorithm of weighting or averaging to maintain an overall picture of performance that may be experienced over the location. Such aggregated data may be used to generate various maps and/or graphical representations to communicate the potential performance which may be available in a given area at a given time. Such information could be displayed on a map, or by other communication such as arrow direction or color direction.

Client Device Application Based Example Mapping

Receiving Location and Performance Information from Client Devices

Additionally, or, alternatively, in some example embodiments, instead of the network estimating location and corresponding performance for individual client devices, in order to populate a performance map of the area, the client devices themselves could self-report to the system. Location could be global position system (GPS) generated, or triangulation based cellular, etc. at the client device itself Such an example may use a software application downloaded to the client devices which then gather and send the data via the network to a system server and/or cloud service.

Thus, in such examples, the performance estimations could be generated not at the network but at the client device. The performance calculation could be from actual transmission and reception rates experienced by the client device. Then the client device could send the system via a network, the information regarding the location and performance, for the system to aggregate with the other client devices in a given area. Additionally, or, alternatively, in some embodiments, a map could be generated with estimated performances in various locations, as reported by client device applications.

Mapped Representations of Service Examples

Additionally, or, alternatively, in certain embodiments, graphical user interfaces could be used to represent calculated available performance in a location. For example, a heat map style map could show potential performance using shading or colors, in a given bounded area.

Additionally, or, alternatively, certain example embodiments of maps may break a given location into a grid. In such an example, the system could populate each grid square with the calculated predicted performance that may be achieved for client devices situated there or near there. Such a population of a grid square could use any graphical representation such as different colors or shadings. Further, there could be icons or outlines showing various things that a user could interpret as a scale of available potential performance. Icons could show locations of APs or other things as well.

Figure 7:
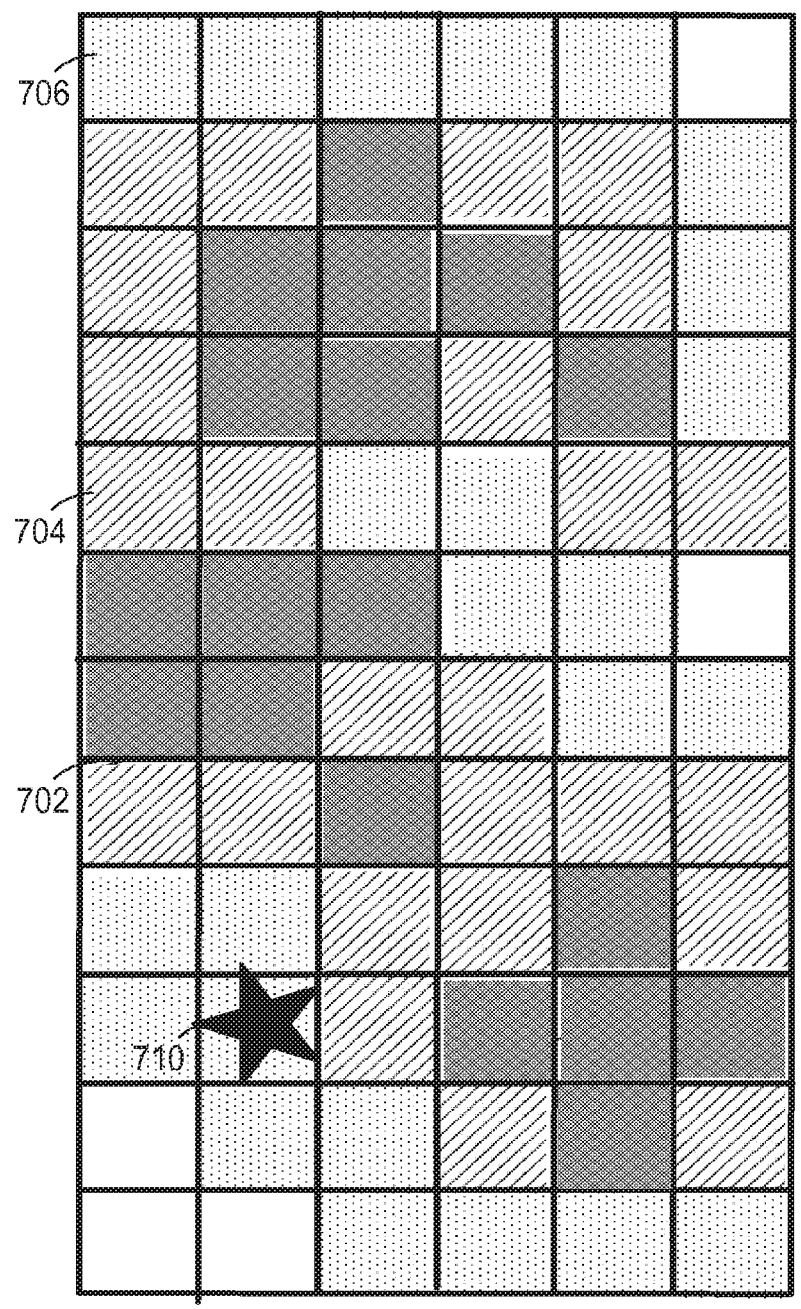
FIG. 7 is a diagram showing a heat may style grid map as an example of certain examples of the inventions described here.

An example of such a heat map on a grid is shown in FIG. 7. In FIG. 7, the example area is broken into a square grid as an example only. Any kind of shape could be used in such an example such as a hexagonal, triangular, rectangular, or any other shape. The resolution of the grid is also exemplary and could be any resolution based on the location information available for the client devices. In the example of FIG. 7, the APs are not themselves visible, but the available performance in a given area is shown.

Thus, in the example in FIG. 7, the system has built a performance map using location estimate information coupled with performance estimations at those locations. For example, locations where the system has calculated or estimated that relatively good performance is available are shown in a dark shading 702. Again this could be a particular color or icon, depending on the embodiment. The areas of slashed or lighter shading 704 could be areas where relatively poorer performance is available than the darker areas 702. Again, this could be because of any number of variable such as physical barriers, congestion of client devices, interference, etc. as described here. The lightest areas 706 are shown with the least amount of performance available. In those areas, there could be many users, interference from a transmitter or a physical impediment blocking transmissions from and/or to an AP or any degrading factors discussed here. Thus, the heat map example of FIG. 7 can show a user of a client device where in the physical area the person could move to in order to receive better performance, based on the former client device reports. In the example, the user is shown as an icon 710, in order to situate them in the map.

It should be noted that the color variations or shading variations in the map could be based on any performance metrics or breakdown. The relative differences among the breakdowns may be what the users of the client devices are interested in, rather than the raw data numbers. Thus, the user may only care to know where to go to receive better service, rather than, where to go to receive 50 mbps of throughput.

Again, the map example of FIG. 7 may be built over time, as the user client devices move about the example area. And over time, the map may be populated with data points based on the estimated locations and the estimated performances at those locations. Additionally, or, alternatively, certain example embodiment systems and methods may estimate performance and location at different time rates. For example, if the system is able to estimate location and performance every 10 seconds, the client device may move a little or a lot or not at all in between estimates. If the system only estimates location and performance every minute, the map would take longer to populate and update. Additionally, or, alternatively, certain embodiments could have any rate at which the estimated performance and location is estimated for a particular client device, depending on the desires of the administrators.

If no client user device ever enters a certain grid square of the map for example, the system may not have a performance estimate for that grid square. Additionally, or, alternatively, in some embodiments, the system could average the performance reported around such a location that is lacking an estimate, and populate it with an average estimate. Additionally, or, alternatively, in some example embodiments, over time, there could be multiple reports of performance in the same location. For example, if a user with a client device moves away from a location and another user with a client device moves into that location, there will be two data points for the same location, at different times. In some examples, the same user device may be used to estimate the performance more than one time, in the same location.

In examples where there are more than one estimated performance for the same or nearby location, the system may do any number of things such as average the data, weight the data, use the newest data only, or any combination of these and other examples. In such a way, the data points over time can be used to keep an updated map of the estimated performance.

Additionally, or, alternatively, in some embodiments, when the system knows it hasn't received estimated performance information at all, or after a certain amount of time, it could prompt a user to move to that location, so the estimated performance of the client device could be calculated.

Figure 8:
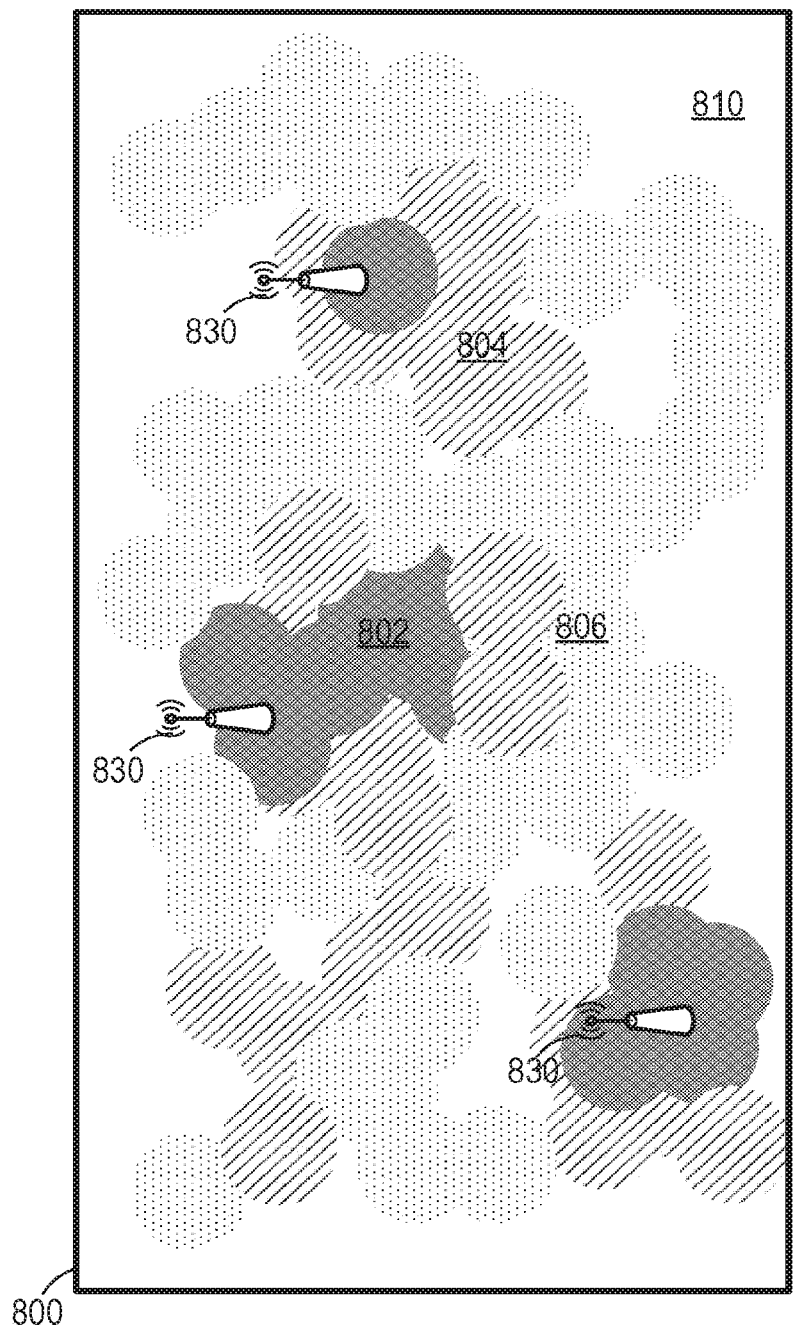
FIG. 8 is a diagram showing a heat may style map as an example of certain examples of the inventions described here.

In addition, or in the alternative to other embodiments disclosed here, another example map embodiment is shown in FIG. 8. In this embodiment example, there are no grid squares but the system has calculated estimates for location and performance for various client devices and/or one client device over time. The area 800 is shown populated with data points ranging from the highest estimated performance 802 to the next highest 804 to the lowest 806 and also where there is none 810. Additionally, or, alternatively, in this example embodiment, the system uses a sample pattern for the located client device, and populates that location with the pattern, in this case a circle, with the associated estimated performance. Over time, as the client devices move about and/or more client devices location and performance are estimated, the system may populate the area 800.

In the example of FIG. 8, the APs 830 are also shown in the map depiction, as an example only. As can be seen from the example data points in FIG. 8, the concentric rings of other example figures such as FIG. 3 are not present. Instead of the theoretical possible performance are more scattered data points. This example may simulate what the system may aggregate based on individual estimates at client devices over time.

Examples without a Map

Figure 9:
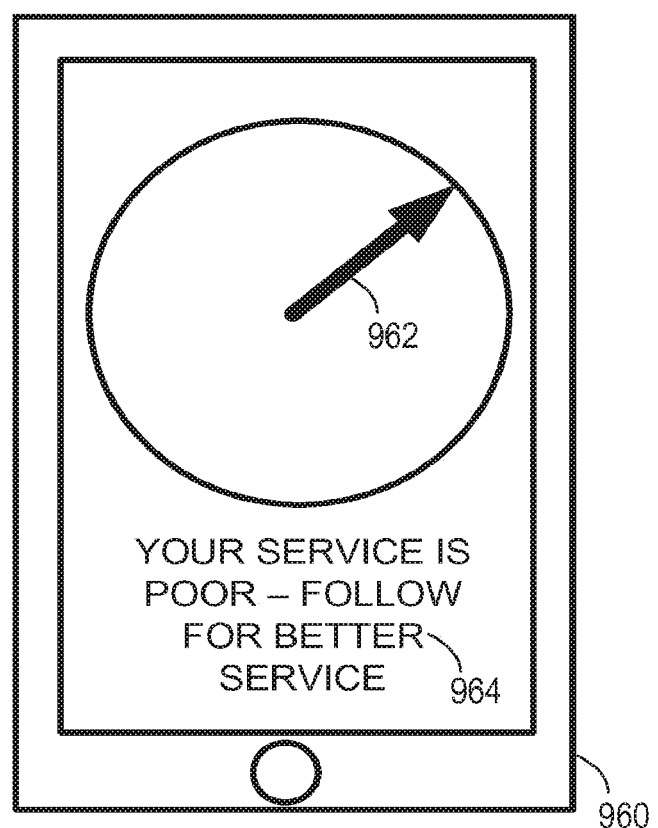
FIG. 9 is a diagram showing an example client device with directions to improve service according to certain examples of the inventions described here.

Additionally, or, alternatively to the embodiments disclosed, here, another example embodiment is shown in FIG. 9. In this example embodiment, the system has mapped the performance in various locations. The system has also estimated or been reported the location of a particular client device. In this example, instead of sending the client device information in the form of a map, the system instead sends the client device instructions on where to move in order to receive better service, relative to the service it is receiving now. In other words, the performance available to a given client device may be improved by moving in the physical space, and the system directs the user of the client device where to go to experience better performance. In some examples, the device calculates that its service is below a particular threshold and it seeks information from the system on where it could receive better service.

In this example of FIG. 9, the client device 960 has received information or calculated that it could receive better service in another location. The device 960 display is shown with a graphical representation of an arrow 962 pointing toward a location with better potential available performance. The arrow example is merely illustrative and any kind of direction information could be utilized. The arrow 962 could act as a compass to guide the user to a physical location that the system knows has better potential performance than where the client device is currently located. The arrow could move as the client device moves, to guide the user.

In this example, the device shows an accompanying text box 964 telling the user that "for better service" follow the arrow. The text box could convey any information to the user regarding the service or the location to be sought for better service. For example the text may explain which room the user of the client device should move to. The text box could explain that the level of service received is the best available and no movement is necessary. Example metrics could be communicated to the user as well, in certain examples, telling the user their current potential performance and the potential performance in another location that they are being directed toward. Such a warning or message and information could show up in certain examples when a client device is experiencing a performance below a set threshold, or when the system informs the client device that it is below a certain threshold.

AP Installation and Deployment Examples

In certain examples, mapping current AP service in a particular area may also be used to model the same area, and predict the effect on service, of the particular arrangement of APs in a given area. Then, such models could be scored and compared, in order to facilitate the decision of which arrangement to use, including the number of APs and the placement of them.

To make the estimates of how APs added to or taken from an area may affect performance service in a given area, an example may use a model of signal strength and/or throughput vs. distance for the new AP based on propagation models. Some examples may draw upon the experienced and/or learned performance that was observed or calculated as available previously throughout the area. Such examples using learned performance may take into account the real interference previously experienced in a given area, then, modeling how a different arrangement of APs may provide service in the area, based on the known behavior and results of the deployed APs, which may have been used to gather the performance information.

These examples could be used to model any arrangement of APs in a given area. They could be used to adjust a given AP arrangement with the removal of one or more APs in a given area, the rearrangement of the APs, an addition of one or more APs, or any combination of adding, removing, and rearranging APs.

Example models could then calculate theoretical performance of a new AP or multiple new APs in the area. The new AP could be modeled as if it were placed one at a time in every location throughout the area. Such example scoring mechanisms could be used to predict the effect the AP arrangement may have on the service provided to a given area. For example, where the next AP should be placed to maximize the system's ability to deliver the best performance, for example, the best performance such as the most throughput, to the most areas in a given location.

After the models were built, the system could score the output maps to help determine which may be the better AP arrangement in the give area. Two examples which may be used to score such maps include an average performance score and the a percentile performance score.

An example that may be used to score the maps of the modeled APs is an average performance scoring system. Such examples may be based on the number of grid squares or covered area generally, that have different performances associated with them. The system could calculate the average of performance over the entire region by adding the performance estimates for each gird square and dividing by the number of grid squares.

An example that may be used to score the maps of the modeled arrangement of APs is a percentile scoring of the performance. In such examples, the administrator may assume that a bad or good experience should be the focus of the performance scoring, instead of the average. Such an example could accumulate the performance estimates for each given area such as a grid square and order the estimates from highest to lowest or lowest to highest. The administrator or system could then determine which percentile to base the score upon. If in an example, the administrator wanted to focus on the best arrangement to deliver the highest performance in the area, it could utilize a comparison of the 90th percentiles of the various arrangements. If the administrator thought a comparison of the low end of the performance service available in a given AP arrangement should be the focus, a 10th percentile comparison could be made among the various AP arrangements. Any percentile could be chosen based on the desires of the administrator or other entity.

Continuing with more details of an example, of percentile scoring, consider a map of a given area broken into 100 grid squares, each with its own performance estimate, calculated either by distance or based on learned performance in the actual physical location. The system could order those 100 performance values and pick the 90th one to see what the 90th percentile performance is for that particular AP arrangement. Then the same could be done with another arrangement and so on, until the models had calculated all of the possible AP arrangements for the number of APs selected by the administrator. The comparison could then determine which scored best in the 90th percentile, and that arrangement of APs could be selected.

In another example, the 10th percentile could be chosen to see which AP arrangement provided for the best coverage across most of the given area. Such an estimation may be different than the averaging example which scores toward the middle service provided by the particular arrangement. In situations where the number of grid squares does not exactly divide into the percentile desired, some interpolation could be used to estimate the score.

The examples could utilize such scoring for any number of grid squares and/or data points of performance over an area. The examples could also utilize any number of AP arrangements throughout the given area, and also any number of APs arranged in the given area.

Some examples may model placing more than one AP, for example two APs in a given area. In such an example, a pair of APs may be modeled to determine the best location to put two APs. For example, the system may determine that placing one AP might be in one place, but if two APs could be placed, it may be in a different location for each. The analysis could then be run and a determination based on budget or physical space could be made, knowing the impact of the placement of any number of APs in the area.

The administrator could also bias the AP arrangement based on actual location, for example, knowing a ceiling fan was in one room, disallowing models with an AP in that area, etc.

Figure 10:
FIG. 10 A is an example performance model of one arrangement of APs according to certain examples of the inventions described here.
Figure 10:
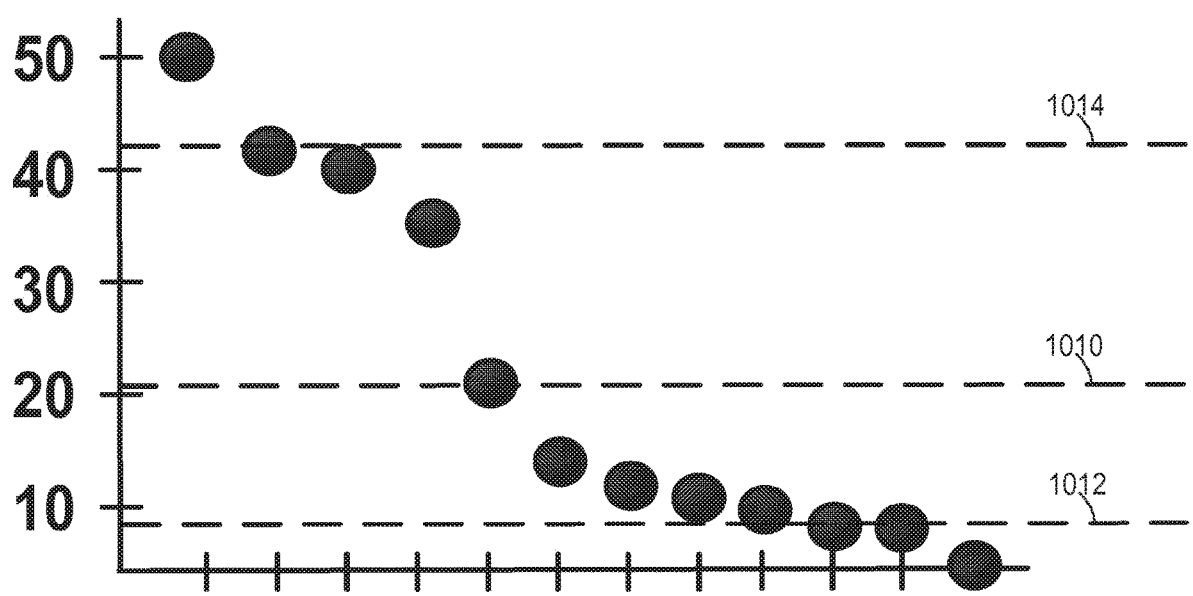

Examples of the above estimations are shown in FIG. 10 A. In FIG. 10 A, a simplified grid is shown with one AP 1002 deployed in the top right corner. The performance measurements/calculations are shown in each grid square, based on some method of modeling. These performances are: 50, 42, 40, 35, 20, 14, 12, 11, 10, 8, 8 and 0. These scores are graphed in an example in FIG. 10 B. The average score 1010 of this particular arrangement in this space, using one AP in the top right corner is 20.83. The 10th percentile score 1014 of this arrangement is about 8. The 90th percentile score 1014 is about 42. Any of these scores could be used for this particular arrangement of APs.

Figure 11A:
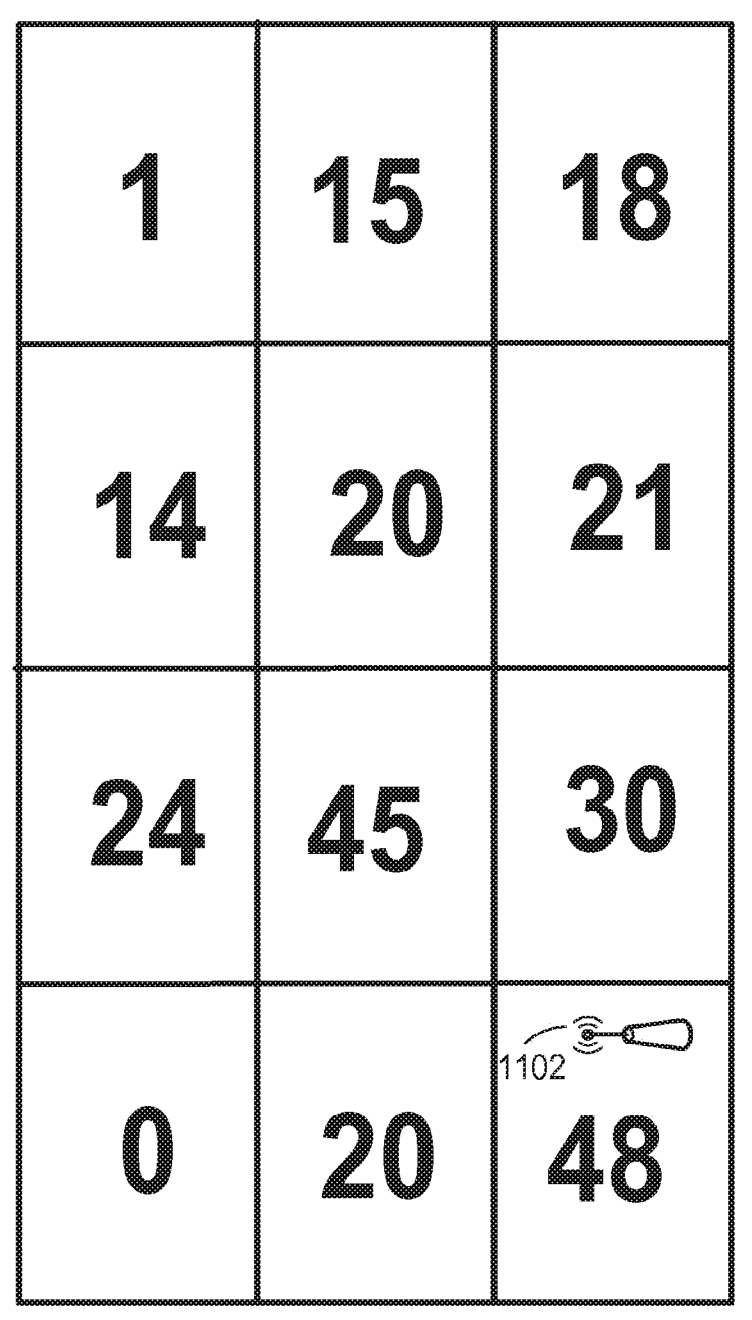
Figure 11:
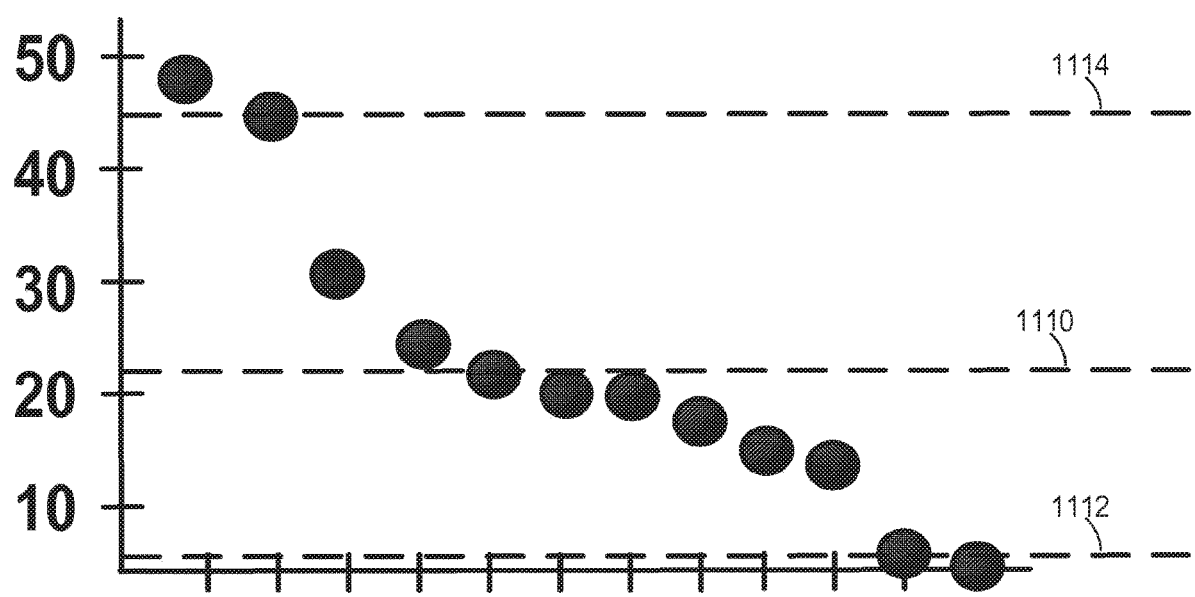
FIG. 11 A is an example performance model of one arrangement of APs according to certain examples of the inventions described here.

In another example in FIG. 11 A, one AP 1102 is deployed in the bottom left corner. The modeling for this arrangement shows performance calculations of 48, 45, 30, 24, 21, 20, 20, 18, 15, 14, 1 and 0. These scores are graphed in an example in FIG. 11 B. The score of this arrangement using the average method 1110 would be 21.3. The 10th percentile score 1112 would be about 1 and the 90th percentile score 1114 would be about 45.

In the examples above, if an administrator wanted the best average performance, the decision may be made to utilize the arrangement in FIG. 11 A with the AP in the bottom left hand corner. This resulted in an average score of 21.3 as opposed to an average score of 20.83 from the arrangement in FIG. 10 A. If the administrator wanted the best score based on the 90th percentile, the arrangement in FIG. 11 A may be chosen again because of the score of 45 as opposed to a score of 42 from the arrangement of FIG. 10 A. But if the administrator wanted to evaluate what arrangement prevented low performance service, the decision may be to use the arrangement in FIG. 10 A because the 10th percentile score was 8 as opposed to 1 from the arrangement in FIG. 11 A.

Display of Performance Potential for Multiple Networks

In certain examples, a given client device may have access to more than one network. For example, the client device may have the ability to connect to both a WiFi and a Cellular network in any given area. In such instances, performance may be potentially better through one network than the other based on any number of variables. It may benefit the client device user as well as the network to move the client from one network to another. Such a move may open up bandwidth in the vacated network, to another network that has available bandwidth.

In certain examples, signal strength may already be available to a client device user by looking at the client device itself. In such examples, a user may be able to see that they have "five bars" of reception in a given area. But such users may not be aware of the performance of the network, which may affect their data rates, separate and apart from the signal strength itself. Thus, an indication of performance available on a particular network could benefit a user, and help direct a user to an area with better performance.

In some examples, the system may be aware of the location of each AP in an area. In certain examples, the system could measure performance or some other metric from whichever networks are available in a certain area. For example, if WiFi and cellular were available, the system could measure performance available in each network. Performance could be measured, alternatively or additionally, at individual APs for example in a WiFi network, as described elsewhere in this disclosure.

Using this information, the system could inform the client device and user of the status of the networks. The system could also direct the user to switch networks if a better performance were available through this other network.

In certain examples, the user device could utilize an application to direct a user to a different physical location that the system knows has a radio with a good performance metric.

In certain examples, a display could be used to inform the people in a given room or area as to the status of the various networks available and their metrics available such as performance. Such an example could show a user count or color scheme indicating potential performance available in that area. Such a public display could be used to direct clients to WiFi networks or different APs, or to the cellular or other third network for better performance.

Users in that area could reference this information to pick an area that has better performance than where they may be. This may be an area with fewer users, or an area with more APs etc. Performance and location awareness.

In some examples, an application, downloaded on the client devices is able to calculate performance on more than one network, and send that information to a back end server or cloud service. Such an example could then be used to report on the potential performance available on both the WiFi and cellular network, for example. Such information could be passed to other users of the application, to the room display as described here, or to others via the network.

In some examples, the direction to a user could be given, to find better service, as well as the direction to switch networks in order to do the same.

In certain examples, an application works in conjunction with a back end service on a server via the crowd and the service is able to calculate the WiFi performance at a given client device, and the potential cellular performance, knowing where the client is from the WiFi and/or cellular location calculations.

In some examples, the system could attempt to persuade users to move networks based on different parameters such as the network load or number of users on a particular AP.

Conclusion

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best utilize the invention and various examples with various modifications as are suited to the particular use contemplated.

What is claimed is:

1. A method, comprising:
   by a controller comprising a processor and a memory, the controller in communication with an access point,
      receiving a first data regarding connection performance for a user device,
         wherein the access point and the user device have a first location and first time associated with the received first data;
      mapping the received first data regarding connection performance for the user device, at the first location and first time;
      receiving a second data regarding connection performance for the user device,
         wherein the access point and the user device have a second location and second time associated with the received second data;
      mapping the received second data regarding connection performance for the user device, at the second location and second time;
      calculating a relative direction for the user device to move, to receive improved connection performance; and
      sending an indication of the relative direction for the user device to move, to the access point for the user device.

2. The method of claim 1, further comprising, by the controller, converting the mapped received first data regarding connection performance and the mapped received second data regarding connection performance into a visual reference gradient for display on the user device.

3. The method of claim 1, wherein the connection performance information is throughput data.

4. The method of claim 2 wherein the visual reference gradient is a shaded indicator correlated to the received data regarding connection performance.

5. The method of claim 2 wherein the visual reference gradient is a colored indicator correlated to the received data regarding connection performance.

6. The method of claim 1 further comprising, by the controller:
   sending the visual reference gradient to a second user device for display.

7. The method of claim 1 further comprising, by the controller:
   sending the indication of the relative direction for the user device to move to a second user device for display.

8. The method of claim 1 further comprising, by the controller:
   receiving a third data regarding connection performance for a second user device,
      wherein the access point and the second user device have a third location and third time associated with the received third data; and
   mapping the received third data regarding connection performance for the second user device, at the third location and third time.

9. The method of claim 8, further comprising, by the controller:
   converting the mapped received first data regarding connection performance and the mapped received second data regarding connection performance and the mapped received third data regarding connection performance into a visual reference gradient for display.

10. A non-transitory computer-readable medium having computer-executable instructions thereon for a method, the method comprising:
    by a controller comprising a processor and a memory, the controller in communication with an access point,
       receiving a first data regarding connection performance for a user device,
          wherein the access point and the user device have a first location and first time associated with the received first data;
       mapping the received first data regarding connection performance for the user device, at the first location and first time;
       receiving a second data regarding connection performance for the user device,
          wherein the access point and the user device have a second location and second time associated with the received second data;
       mapping the received second data regarding connection performance for the user device, at the second location and second time; and
       converting the mapped received first data regarding connection performance and the mapped received second data regarding connection performance into a visual reference gradient for display on the user device.

11. The non-transitory computer-readable medium of claim 10, further comprising, by the controller:
    calculating a relative direction for the user device to move, to receive improved connection performance; and sending an indication of the relative direction for the user device to move, to the access point for the user device.

12. The non-transitory computer-readable medium of claim 10, wherein the connection performance information is throughput data.

13. The non-transitory computer-readable medium of claim 10 wherein the visual reference gradient is a shaded indicator correlated to the received data regarding connection performance.

14. The non-transitory computer-readable medium of claim 10 wherein the visual reference gradient is a colored indicator correlated to the received data regarding connection performance.

15. The non-transitory computer-readable medium of claim 10 further comprising, by the controller:
sending the visual reference gradient to a second user device for display.

16. The non-transitory computer-readable medium of claim 10 further comprising, by the controller:
sending the indication of the relative direction for the user device to move to a second user device for display.

17. The non-transitory computer-readable medium of claim 10 further comprising, by the controller:
receiving a third data regarding connection performance for a second user device,
wherein the access point and the second user device have a third location and third time associated with the received third data; and
mapping the received third data regarding connection performance for the second user device, at the third location and third time.

18. The non-transitory computer-readable medium of claim 17, further comprising, by the controller:
converting the mapped received first data regarding connection performance and the mapped received second data regarding connection performance and the mapped received third data regarding connection performance into a visual reference gradient for display.

19. A system, comprising:
a controller comprising a processor and a memory, the controller in communication with an access point, the controller configured to:
receive a first data regarding connection performance for a user device,
wherein the access point and the user device have a first location and first time associated with the received first data;
map the received first data regarding connection performance for the user device, at the first location and first time;
receive a second data regarding connection performance for the user device,
wherein the access point and the user device have a second location and second time associated with the received second data;
map the received second data regarding connection performance for the user device, at the second location and second time;
calculate a relative direction for the user device to move, to receive improved connection performance; and
send an indication of the relative direction for the user device to move, to the access point for the user device.

* * * * *